(12) United States Patent
Marsh

(10) Patent No.: US 11,359,619 B2
(45) Date of Patent: Jun. 14, 2022

(54) VALVE HAVING A FIRST AND SECOND OBSTRUCTION CONFINING THE VALVE FROM LEAVING A CONFINING REGION

(71) Applicant: Encite LLC, Burlington, MA (US)

(72) Inventor: Stephen A. Marsh, Carlisle, MA (US)

(73) Assignee: Encite LLC, Burlington, MA (US)

( * ) Notice: Subject to any disclaimer, the term of this patent is extended or adjusted under 35 U.S.C. 154(b) by 176 days.

(21) Appl. No.: 16/190,238

(22) Filed: Nov. 14, 2018

(65) Prior Publication Data

US 2019/0145396 A1 May 16, 2019

Related U.S. Application Data

(60) Provisional application No. 62/585,606, filed on Nov. 14, 2017.

(51) Int. Cl.
*F04B 43/04* (2006.01)
*F04B 45/047* (2006.01)
(Continued)

(52) U.S. Cl.
CPC ........ *F04B 43/043* (2013.01); *F04B 39/1013* (2013.01); *F04B 45/043* (2013.01); *F04B 45/047* (2013.01); *F04B 53/108* (2013.01); *F04B 53/1022* (2013.01); *F04B 19/20* (2013.01); *F04B 35/04* (2013.01); *F04B 39/10* (2013.01); *F04B 45/04* (2013.01); *F16K 99/0011* (2013.01)

(58) Field of Classification Search
CPC .... F04B 39/1013; F04B 45/043; F04B 19/20; F04B 45/045; F04B 53/1022; F04B 53/1025; F04B 53/1027; F04B 53/108; F16K 99/0005; F16K 99/0011; F16K 99/0028
See application file for complete search history.

(56) References Cited

U.S. PATENT DOCUMENTS 2,196,287 A * 4/1940 Baudette ................. F04B 39/10
  137/512
4,188,174 A * 2/1980 Perkins ................. F04B 53/102
  137/246.22

(Continued)

OTHER PUBLICATIONS

International Search Report and Written Opinion, PCT/US18/60905, dated Jan. 24, 2019, p. 1-14.

*Primary Examiner* — Nathan C Zollinger
*Assistant Examiner* — Timothy P Solak
(74) *Attorney, Agent, or Firm* — Fish & Richardson P.C.

(57) ABSTRACT

Disclosed are techniques such as roll to roll processing to produce inlet valves for controlling entry of fluid into a compartment of a device. The valve includes a body having a compartment and an inlet into the compartment, with the inlet being bifurcated by a pair of spaced wall portions of the body that form a confining region and which pair of spaced wall portions together with wall portions of the body provide a pair of spaced inlet portions into the compartment and a valve member having a first portion that is position-able within a portion of the compartment, an intermediate portion, and a second portion coupled to the first portion by the intermediate portion, with the second portion position-able within the confining region and with the second portion having an obstruction portion.

23 Claims, 13 Drawing Sheets

(51) Int. Cl.
    *F04B 45/04*    (2006.01)
    *F04B 53/10*    (2006.01)
    *F04B 39/10*    (2006.01)
    *F16K 99/00*    (2006.01)
    *F04B 35/04*    (2006.01)
    *F04B 19/20*    (2006.01)

(56) References Cited

U.S. PATENT DOCUMENTS

| | | | | |
|---|---|---|---|---|
| 4,370,103 | A * | 1/1983 | Tripp | F04B 39/1013 |
| | | | | 417/298 |
| 5,983,927 | A * | 11/1999 | Simon | B05B 11/3067 |
| | | | | 137/516.27 |
| 8,388,908 | B2 * | 3/2013 | Blaga | F16K 99/0015 |
| | | | | 422/503 |
| 9,192,720 | B2 | 11/2015 | Chappel et al. | |
| 2003/0136926 | A1 | 7/2003 | Hunnicutt | |
| 2005/0257835 | A1 | 11/2005 | Midtgard et al. | |
| 2008/0035875 | A1 | 2/2008 | Tai et al. | |
| 2013/0095400 | A1 * | 4/2013 | Lundblad | F03G 7/005 |
| | | | | 429/422 |
| 2013/0209298 | A1 * | 8/2013 | Gaertner | F04B 53/1032 |
| | | | | 417/443 |
| 2014/0041727 | A1 | 2/2014 | Hansen et al. | |
| 2015/0267695 | A1 * | 9/2015 | Marsh | F04B 45/047 |
| | | | | 128/205.24 |
| 2016/0131126 | A1 | 5/2016 | Marsh | |

* cited by examiner

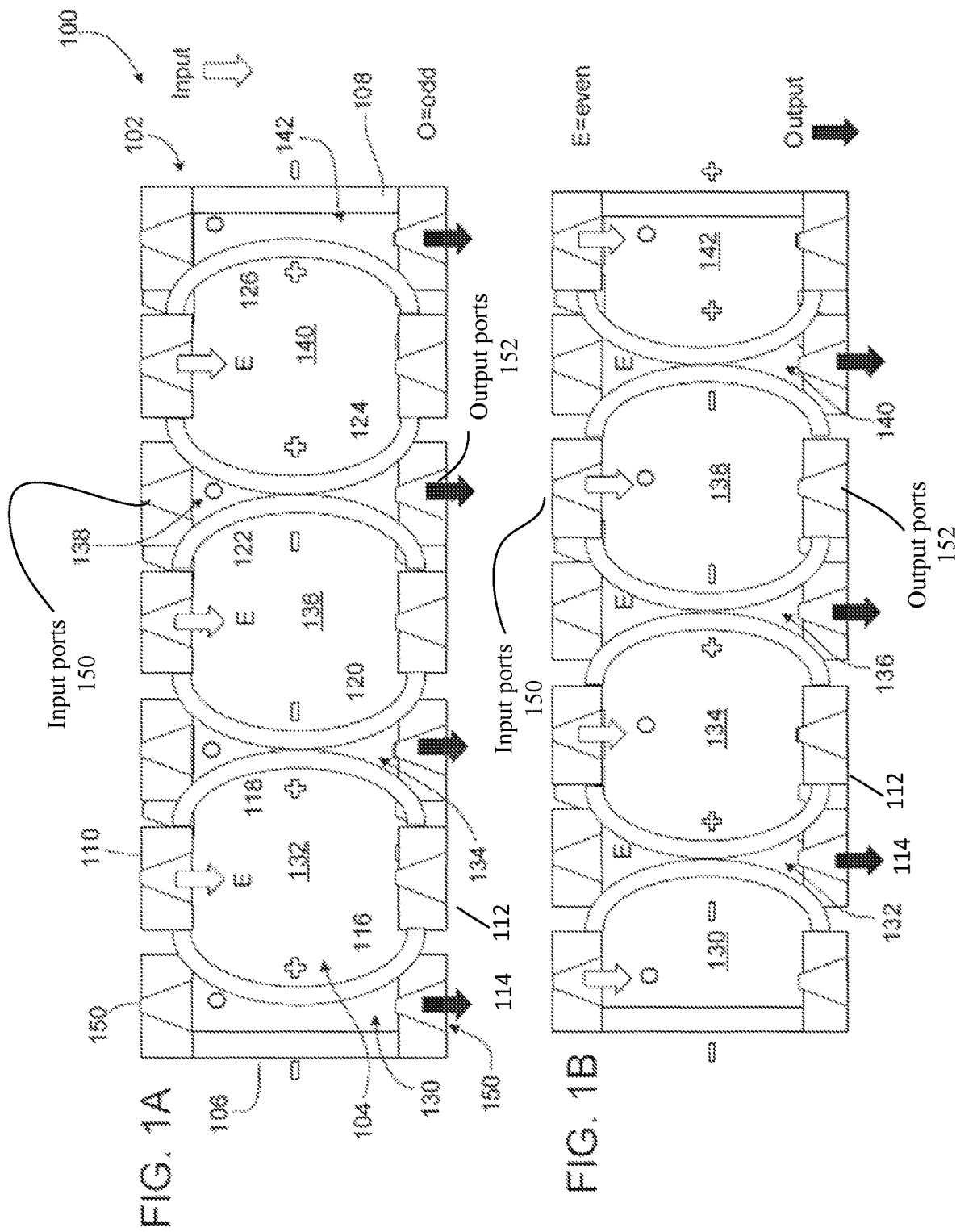

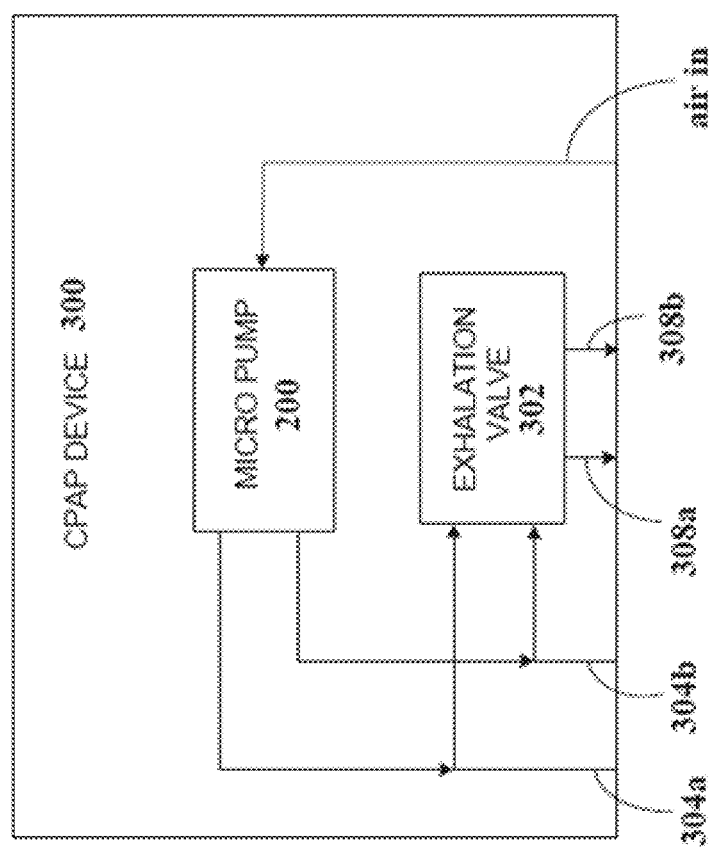

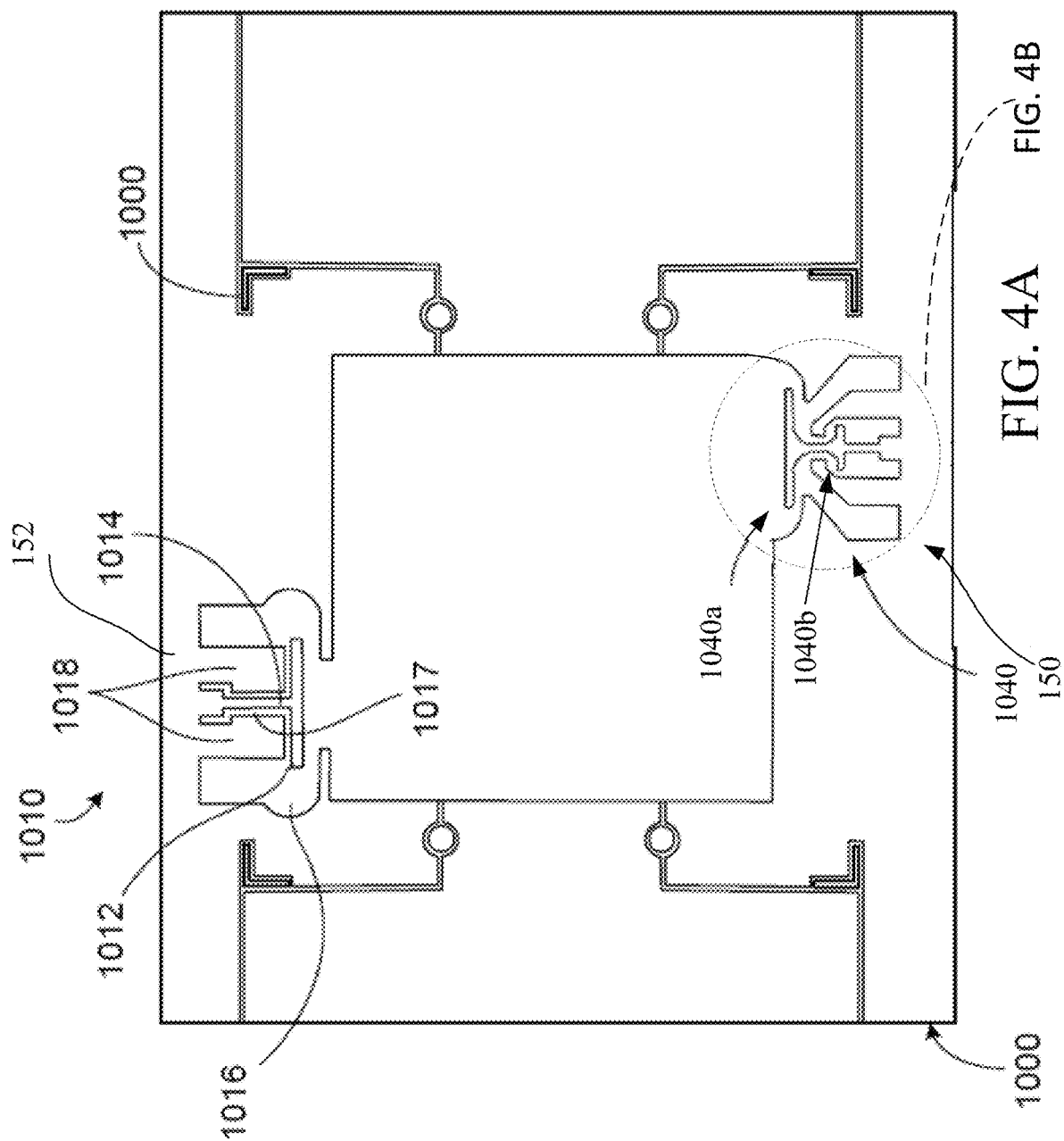

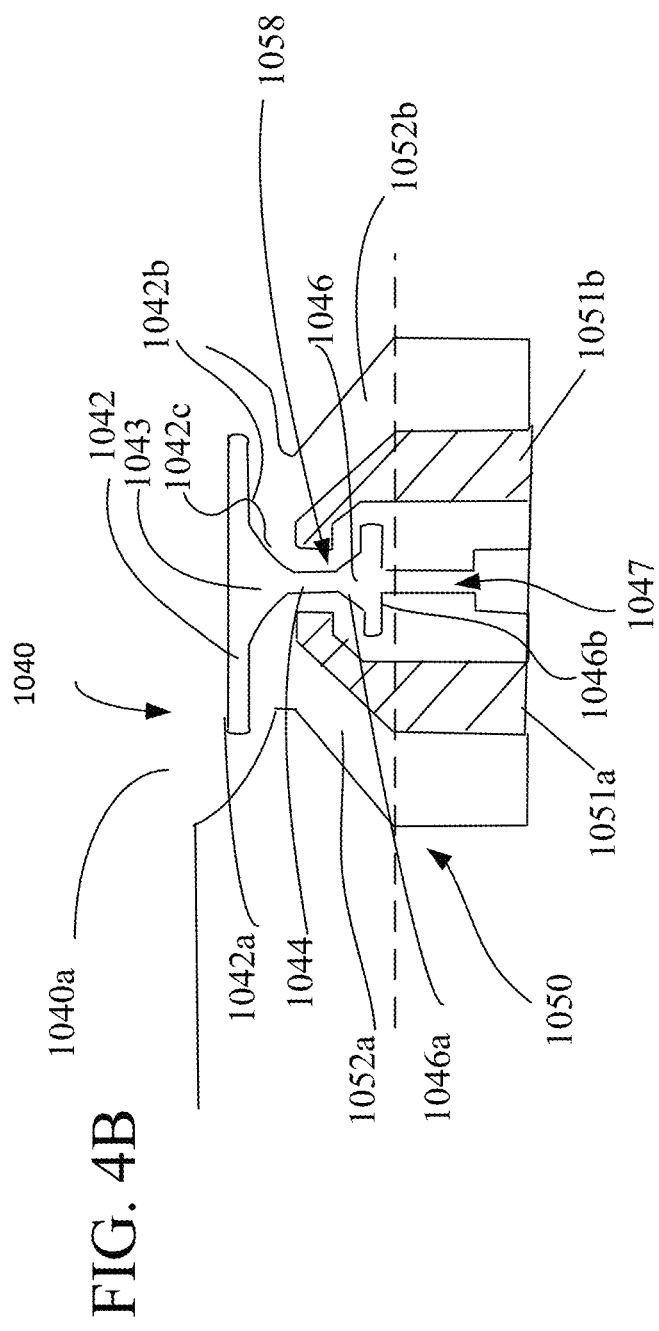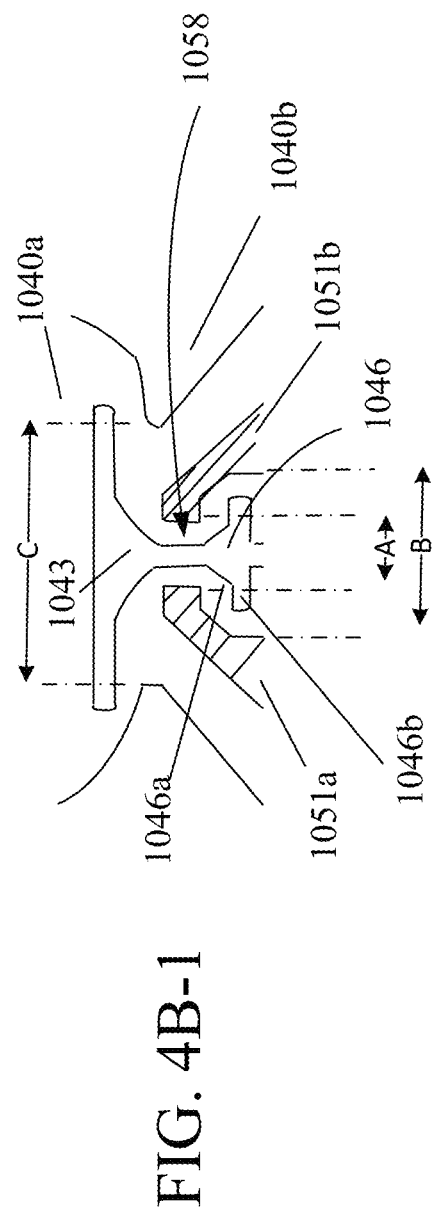
FIG. 4B
FIG. 4B-1

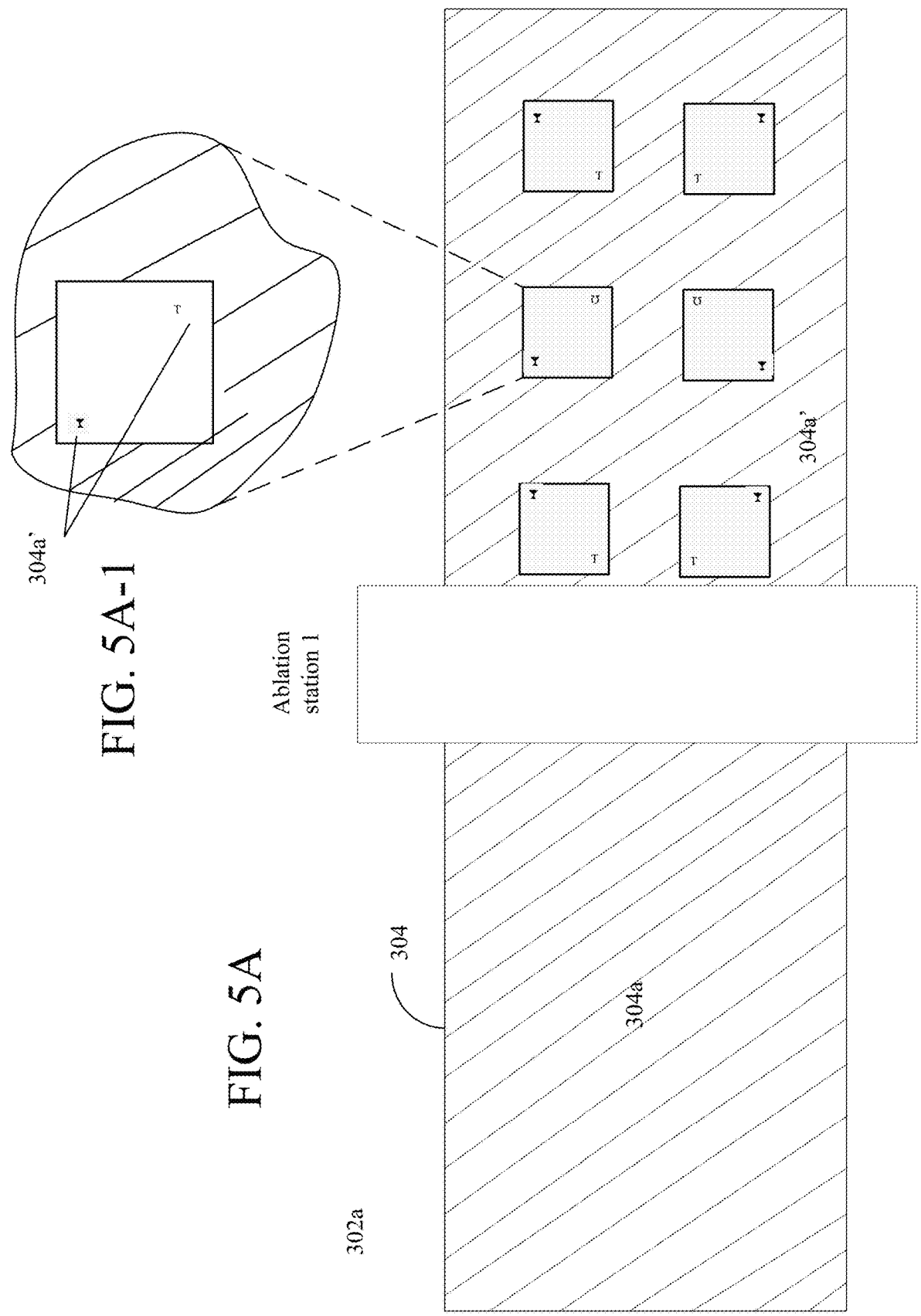

VALVE HAVING A FIRST AND SECOND OBSTRUCTION CONFINING THE VALVE FROM LEAVING A CONFINING REGION

This application claims priority under 35 U.S.C. § 119 to U.S. Provisional Patent Application Ser. No. 62/585,606, filed Nov. 14, 2017, and entitled "Microelectromechanical Systems Fabricated with Roll to Roll Processing", the entire contents of which is incorporated herein by reference.

BACKGROUND

This specification relates to microelectromechanical systems fabricated by roll to roll processing.

Microelectromechanical systems (MEMS) is the name given to a technology in which electro-mechanical components of micro-meter size are fabricated on substrates of silicon using silicon semiconductor process lines that are commonly used in semiconductor device fabrication, i.e. deposition of material layers that are patterning by photolithography and etching processing, polymers using processes such as injection molding, embossing or stereo-lithography (3D printing) especially for microfluidic applications, and metals that are deposited by electroplating, evaporation, and sputtering processes. Ceramics such as nitrides of silicon, aluminum and titanium as well as silicon carbide and other ceramics materials properties. Microelectromechanical systems typically include a central unit that processes data and several components that interact with surroundings. Examples of microelectromechanical systems include micro-sensors (bio, chemical and mechanical), various types of structures and micro-actuators.

SUMMARY

According to an aspect, a valve for controlling entry of fluid into a compartment of a micro-mechanical device includes a body defining the compartment, with the body having at least one passage through walls of the body to define an inlet passage into the compartment, with the at least one passage in the inlet defined by a wall portion of the body that is spaced from the body and that in part provides a confining region, and a valve member having a first portion that has a first obstruction, with the first portion position-able within a portion of the compartment, an intermediate portion, and a second portion having a second obstruction, with the intermediate portion connecting the second portion to the first portion, and with the first and second obstructions confining the valve member to slide through but not leave the confining region.

According to an additional aspect, a valve for controlling entry of fluid into a compartment of a micro-mechanical device includes a body defining a compartment, the body having at least one passage through walls of the body to define an inlet passage into the compartment, with the at least one passage in the inlet defined by a wall portion of the body that is spaced from the body and that forms a confining region and which wall portion together and an adjacent wall of the body providing the inlet portion into the compartment and a valve member having a first portion that is position-able within a portion of the compartment, an intermediate portion, and a second portion coupled to the first portion by the intermediate portion, with the second portion position-able within the confining region and with the second portion having an obstruction portion.

According to an additional aspect, a valve for controlling entry of fluid into a compartment of a micro-mechanical device includes a body having a chamber and an inlet that is bifurcated by a pair of spaced wall portions that form a confining region and which pair of spaced wall portions together with wall portions of the body provide a pair of spaced inlet portions into the chamber and a valve member having a first portion that is position-able within a portion of the compartment, an intermediate portion, and a second portion coupled to the first portion by the intermediate portion, with the second portion position-able within the confining region and with the second portion having an obstruction portion.

Other aspects include methods of manufacture and operation of valves and other structures in roll to roll implementations for constructing such devices with releasable and moveable features.

The details of one or more embodiments of the invention are set forth in the accompanying drawings and the description below. Other features, objects, and advantages of the invention are apparent from the description and drawings, and from the claims.

DESCRIPTION OF DRAWINGS

FIGS. 1A and 1B are functional block diagrams of a microelectromechanical system such as a micro pump operating in two opposite phases of a pumping cycle.

FIG. 3 is a block diagram of a CPAP device using the micro pump of FIGS. 1A-2D.

FIGS. 4A-4E are plan views showing details of exemplary sliding valves.

FIG. 4B-1 shows details of FIG. 4B.

FIGS. 5A-5D are views of a roll to roll implementation for constructing a device with releasable and moveable features.

FIG. 5A-1 shows details of FIG. 5A.

DETAILED DESCRIPTION

Overview

Figure 2A:
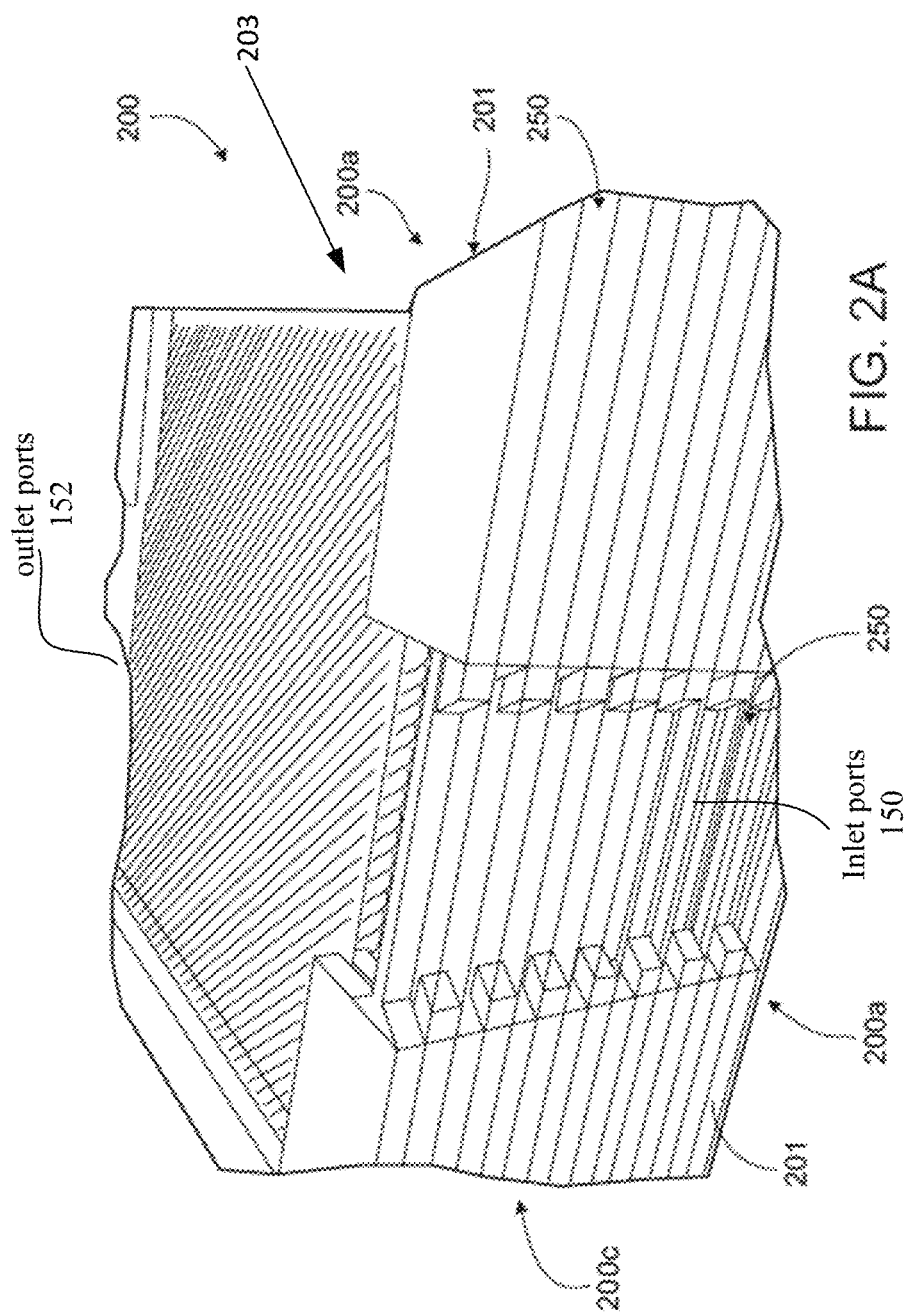
FIG. 2A is an assembled view of a stack of assembled module layers.

Microelectromechanical systems such as micro-sensors, micro actuators of which a micro pump as discussed below are fabricated by roll to roll processing.

Microelectromechanical systems can be lab-on-a-chip systems, can be used in fuel cells, high flux electronic cooling systems, and biochemistry systems. The microelectromechanical systems such as micro pumps can transport fluids, e.g., gas or liquids, in small, accurately measured quantities. The micro pumps can be used in various applications. As being fabricated with roll to roll techniques these devices can be made very inexpensively.

Micro Pump Systems

Micro Pumps

Microelectromechanical systems fabricated by roll to roll processing will now be described in conjunction with the micro-pump example.

Micro pump systems are disclosed in co-pending published patent application US-2016-0131126-A1, the entire contents of which are incorporated herein by reference in their entirety. For brevity, a summary of such micro pumps is set out below.

FIGS. 1A and 1B show a micro pump 100 that includes a single compartmentalized pump chamber 104. The pump body 102 includes two walls 110, 112 along the pumping direction 114, and two fixed end walls 106, 108 opposite to each other along a direction perpendicular to the pumping direction 114. The walls 106, 108, 110 and 112 define the single chamber 104 that is compartmentalized by membranes. That is, between the two end walls 106, 108, membranes 116, 118, 120, 122, 124, 126 extend from the wall 110 to the wall 112, separating the pump chamber 104 into seven compartments 130, 132, 134, 136, 138, 140, 142. In this implementation, each compartment includes an inlet port 150 and an outlet port 152 defined in the walls 110, 112, respectively. For example, the compartment 130 includes the inlet port 150 in the wall 110 and the outlet port 152 in the wall 112 denoted by lead lines. Others of the inlet ports 150 and the outlet ports 152 are not denoted by lead lines for clarity.

The compartments 130-142 are fluidically sealed from each other. In some implementations, different compartments can have the same inlet and/or the same outlet (not shown in the figure) and these different compartments may fluidically communicate with each other. Two compartments 130, 142 at the opposite ends of the pump chamber 104 have walls provided by a fixed wall of the pump body 102 and a membrane. All other intermediate compartments between the compartments 130, 142 have walls formed of two membranes. In some embodiments at least one intermediate compartment has compartment walls formed of two membranes. Although six membranes are shown in the figures, the pump chamber 104 can be extended with additional intermediate compartments. An electrode (not explicitly shown in FIGS. 1A and 1B, see, FIGS. 2A and 2C) is attached to each of the membranes 116-126 and optionally to the end walls caps 106, 108. Also not explicitly shown are walls that are on a front side and back side of the micro pump.

The electrodes are connected to a drive circuit (not shown but set out in the incorporated by reference published application), that delivers voltages to the electrodes to activate the membranes through electrostatic attraction/repulsion. Without activation, the membranes rest at nominal positions identified by the dotted lines in the figures. Each membrane at rest can be substantially parallel to the end walls 106, 108 and the compartments 132-140 can have the same nominal volume $V_i$. For example, the distance between two adjacent membranes in their nominal positions is about 50 microns, and the nominal volume $V_i$ can range from nanoliters to microliters to milliliters, e.g., 0.1 microliters.

In some implementations, the compartments 130, 142 each has a nominal volume $V_e$ that is half the nominal volume of the intermediate compartments 132-140. For example, the distance between the membrane 116 in its nominal position and the end wall 106 or between the membrane 126 in its nominal position and the end wall 108 is about 25 microns. The nominal volume $V_e$ can range from nanoliters to microliters to milliliters, e.g., 0.05 microliters. The compartments 130-142 can also have different sizes. The sizes are chosen based on, e.g., specific process requirements of a roll to roll manufacturing line, as well as, power consumption, and application considerations.

Other details are set forth in the above mention incorporated by reference published patent application.

FIGS. 1A and 1B show two operational states of the same pump, a compartment is compressed when adjacent membranes move towards each other and reduce the volume of the compartment to discharge gas from the compartment. Simultaneous to the compression of that compartment, adjacent compartments are charged when its two membranes move away from each other to expand the chamber 104 volume. When actuated, each membrane of the pump chamber 104 can move in two opposite directions about a central, nominal location at which the membrane rests when it is not actuated.

In operation, the membrane of the conventional pump chamber 104 forms a single pump chamber 104 that is used in pumping. Gas is charged and discharged once during the charging and discharging operations of a pumping cycle, respectively. The gas outflows only during half of the cycle, and the gas inflows during the other half of the cycle.

In the instant micro pump, a pump chamber 104 is compartmentalized into plural compartments and each compartment is used in pumping. For example, two membranes between two fixed end walls form three compartments for pumping. The micro pump can have a higher efficiency and can consume less energy than a conventional pump performing the same amount pumping, e.g., because the individual membranes travel less distance and therefore are driven less. The efficiency and energy saving can further increase when the number of membranes and compartments between the two fixed end walls increases.

Generally, to perform pumping, each compartment includes one of such inlet ports 150 one of such outlet ports 152. The inlet ports 150 and the outlet ports 152 each include a valve, e.g., a passive valve that opens or closes in response to pressure applied to the valve. Details of an implementation of sliding valves are set out below. The valves do not require any active drive but instead are driven by a differential pressure across the valves created by flow of gas in or out of the pump compartment. Because no active driving is required, the valves can reduce the complication of pump operation.

Generally, the membranes are driven to move by electrostatic force. An electrode can be attached to each of the fixed end walls and the membranes. During the charging operation of a compartment, the two adjacent electrodes of the compartment have the same positive or negative voltages, causing the two electrodes and therefore, the two membranes to repel each other. During the discharging operation of a compartment, two adjacent electrodes of the compartment have the opposite positive or negative voltages, causing the two electrodes and therefore, the two membranes to attract to each other. The two electrodes of a compartment form a parallel plate electrostatic actuator.

The electrodes generally have small sizes and low static power consumption. A high voltage can be applied to each electrode to actuate the compartment. But the actuation can be performed at a low current.

As described previously, each membrane of the micro pump moves in two opposite directions relative to its central, nominal position. Accordingly, compared to a compartment in a conventional pump, to expand or reduce a compartment by the same amount of volume, the membrane of this specification travels a distance less than, e.g., half of, the membrane in the conventional pump. As a result, the membrane experiences less flexing and less stress, leading to longer life and allowing for greater choice of materials. In addition, because the travel distance of the membrane is relatively small, the starting drive voltage for the electrode on the membrane can be relatively low. Accordingly, less power is consumed. For a compartment having two membranes, since both membranes are moving, the time it takes to reach the pull-in voltage can be shorter.

Below are some example criteria for choosing the materials of the different parts of the micro pump.

Pump body and valves—The material used for the body of a pump may be defined by the requirements of the integrated valves, if the valves are made of the same material as the body. In some implementations, the material needs to be strong or stiff enough to hold its shape to provide the pump chamber 104 volume, yet elastic enough to allow the valves to move as desired. In some implementations, the material is etch-able or photo-sensitive so that its features can be defined and machined/developed. Sometimes it is also desirable that the material interact well, e.g., adheres with the other materials in the micro pump. Furthermore, the material is electrically non-conductive. Examples of suitable materials include SU8 (negative epoxy resist), and PMMA (Polymethyl methacrylate) resist.

Membrane—The material for this part forms a tympanic structure (a thin tense membrane covering the pump chamber 104) that is used to charge and discharge the pump chamber 104. As such, the material is required to bend or stretch back and forth over a desired distance and has elastic characteristics. The membrane material is impermeable to fluids, including gas and liquids, is electrically non-conductive, and possesses a high breakdown voltage. Examples of suitable materials include silicon nitride and Teflon.

Electrodes—This structures are very thin and comprised of material that is electrically conductive. Because the electrodes do not conduct much current, the material can have a high electrical resistance, although the high resistance feature is not necessarily desirable. The electrodes are subject to bending and stretching with the membranes, and therefore, it is desirable that the material is supple to handle the bending and stretching without fatigue and failure. In addition, the electrode material and the membrane material will need to adhere well to each other, e.g., will not delaminate from each other, under the conditions of operation. Examples of suitable materials include gold, and platinum.

Electrical interconnects—The drive voltage is conducted to the electrode on each membrane of each compartment. Electrically conducting paths to these electrodes can be built using conductive materials, e.g., gold, and platinum.

In FIGS. 2A-2D, a modularized micro pump having a pump chamber 203 is shown.

Referring to FIG. 2A a modularized micro pump 200 is comprised of module layers 201 (FIGS. 2B and 2C) to form end compartments 200a, 200b of the pump 200. The modularized micro pump 200 is also comprised of many module layers 250 (FIG. 2D) to form intermediate compartments 200c of the pump 200 and a single pump chamber 203 that is compartmentalized by the intermediate compartments 200c. The valves in the micro pump 200 can be replaced by single valves connected to such inlet ports 150 such outlet ports 152, respectively or the individual valves in each layer can be staggered.

Figure 2B:
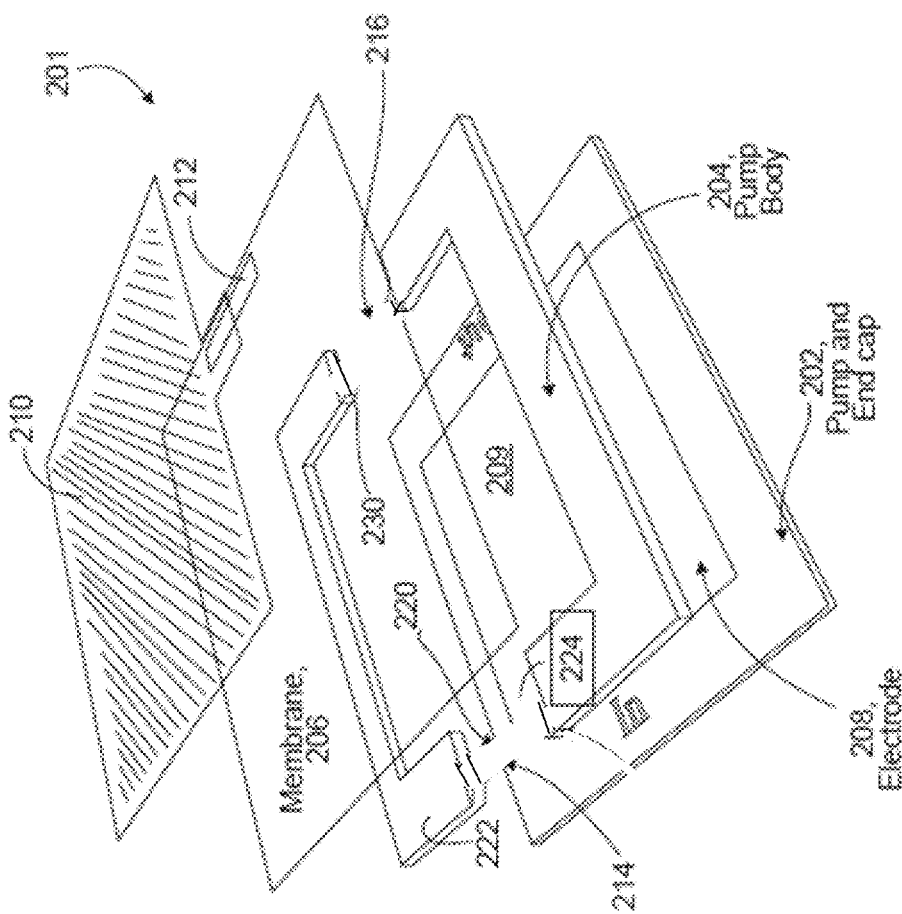
FIG. 2B is an exploded view of layers for a module layer.

Referring now to FIG. 2B, the module layers 201 each include a pump end cap 202 forming a fixed pump wall (similar to walls 106, 108 FIGS. 1A, 1B). An electrode 208 is attached to the pump end cap 202 for activating a compartment 209. A single module layer 201 forms a portion of a pump body 204 between the pump end cap 202 with the electrode 208, and a membrane 206 along with an electrode 210 that is attached to the membrane 206 on the opposite side of the pump body 204 (similar as the membrane 116, 126 in FIGS. 1A, 1B). The electrode 210 includes a lead 212 to be connected to a drive circuit external to the module layer 201. The pump body 204 includes two passive valves (not shown) that are in the regions 214, 216, but which are tau and curved tau valves as will be discussed in FIGS. 4A-4E and fabricated as in FIGS. 5A-5D, below.

The membrane 206, the pump end cap 202, and the pump body 204 can have the same dimensions, and the electrodes 208, 210 can have smaller dimensions than the membrane 206 or the other elements. In some implementations, the membrane 206 has a dimension of about microns by microns to about millimeters by millimeters, and a thickness of about 5 microns. The pump body 204 has an outer dimension of about microns by microns to about millimeters by millimeters, a thickness of about 50 microns, and an inner dimension of about microns by microns to about millimeters by millimeters. The thickness of the pump body defines the nominal size of the compartment 209 (similar to compartments 130, 142 FIG. 1A). The electrodes 210, 202 have dimensions that substantially correspond to inner dimensions of the pump body 204. In some implementations, the electrodes have a surface area of about 2.25 $mm^2$ and a thickness of about 0.5 microns. An assembled module layer 201 is shown in FIG. 2C.

Figure 2C:
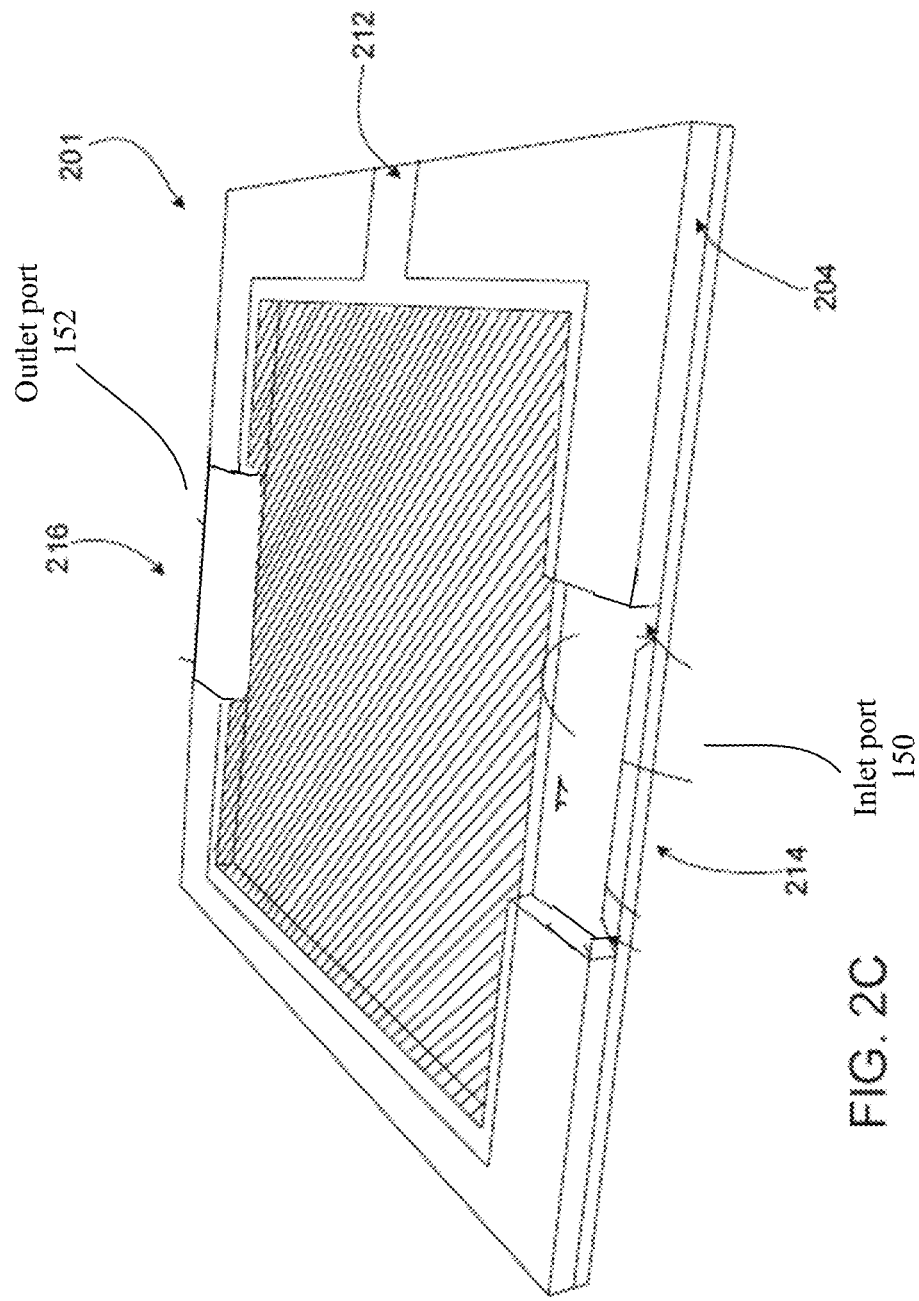
FIG. 2C is an assembled view of the layers of FIG. 2B into a module layer.

Referring now also to FIG. 2C, the pump body 204 includes two passive valves (not shown) that are placed in the regions 214, 216, at the inlet port 150 and the outlet port 152, respectively. In FIG. 2C the values are not depicted. But the tau and curved tau valves as will be discussed in FIGS. 4A-4E and fabricated as in FIGS. 5A-5D, will be used instead.

The functions of the inlet valves are to open the inlets during an ingress of fluid into the compartments during a charging cycle of such compartments and to close the inlet valves during a discharging operation of such compartments. Coincidentally, the functions of the outlet valves are to open the outlets during an egress of fluid from the compartments during a discharging cycle of such compartments and to close the outlet valves during a charging operation of such compartments. These functions occur by establishing pressure differentials during a charging operation in which a fluid flows from outside the module layer into the compartment 209, and a different pressure differential during a discharging operation in which a fluid flows from the compartment 209 into the outside ambient or a fluid sink.

Figure 2D:
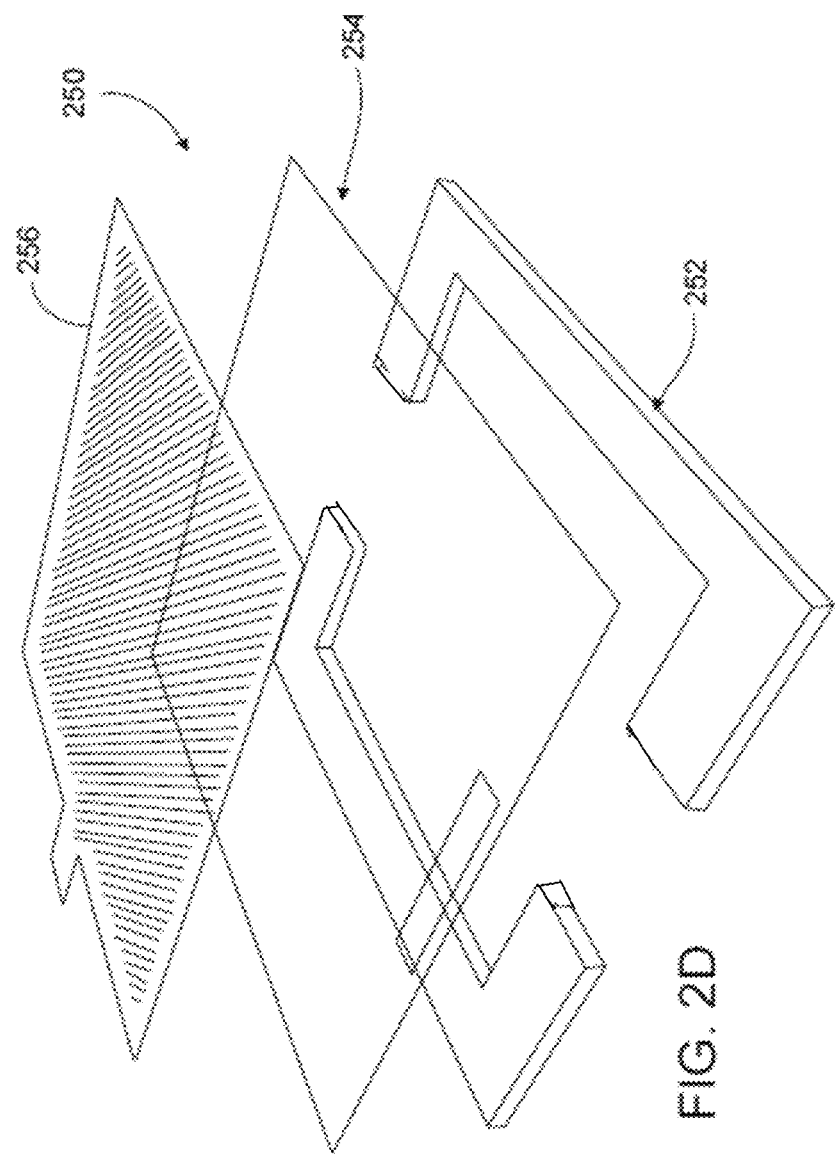
FIG. 2D is an exploded view of an intermediate module layer.

Referring to FIG. 2D, intermediate compartments (similar to compartments 132-140 FIGS. 1A-B) can each be formed using a module layer 250. The module layer 250 includes a pump body 252, an electrode 256, and a membrane 254 formed between the electrode 256 and the pump body 252. The pump body 252 can have similar or the same features as the pump body 204, the electrode 256 can have similar or the same features as the electrode 208, and the membrane 254 can have similar or the same features as the membrane 206. The module layer 250 also includes valves (not referenced but shown in the figure.)

The valves of each pump body are formed integrally with the pump body. Although the electrodes are shown as a pre-prepared sheet to be attached to the other elements, the electrodes can be formed directly onto those elements, e.g., by printing. The different elements of the module layers 200, 250 can be bonded to each other using an adhesive. In some implementations, a solvent can be used to partially melt the different elements and adhere them together.

Referring back to FIG. 2A, multiple, e.g., two, three, or any desired number of, module layers 250 of FIG. 2D are stacked on top of each other to form multiple intermediate compartments in the pump chamber 203. In the stack 200, each membrane is separated by a pump body and each pump body is separated by a membrane. To form a complete pump, a module layer 201 of FIG. 2B is placed on each of the top and bottom ends of the stack 200 so that the pump end caps of the module layer 201 form two fixed end walls of the pump chamber 203.

Other details of operation including drive circuitry and drive waveforms are disclosed in the above mentioned incorporated by reference published application.

Integration of the Systems in Devices

The micro pump systems described above can be integrated in different products or devices to perform different functions. For example, the micro pump systems can replace a fan or a blower in a device, e.g., a computer or a refrigerator, as air movers to move air. Compared to the conventional fans or blowers, the micro pumps may be able to perform better at a lower cost with a higher reliability. In some implementations, these air movers are directly built into a host at a fundamental level in a massively parallel configuration. In some implementations, the micro pump systems receive power from a host product into which the systems are integrated.

The module layer stack of FIGS. 1A, 1B, and 2D can be viewed as module layers connected in parallel. The volume of each individual module layer, $V_i$ or $V_e$, is small. In some implementations, even the total volume of all layers in the stack is relatively small. In some implementations, multiple stacks or micro pumps can be connected in parallel to increase the total volume flow rate.

Similarly, the pressure capability of an individual micro pump is relatively low. Even though there are multiple module layers in a stack, the layers do not increase the total pressure of the stack because they are connected in parallel. However, the pressure of the stack can be increased when multiple stacks or micro pumps are connected in series. In some implementations, the pumps connected in series are driven at different speeds to compensate for different mass flow rates. For example, built-in plenums or plumbing in a tree type configuration can also be used to compensate for different mass flow rates. Further details on stacking and series interconnection for various system configurations as well as example applications are set out in the above mentioned incorporated by reference published application.

One particular application of the micro pump is as a CPAP (continuous positive airway pressure) device. A CPAP device is an autonomous device for treating breathing disorders. The device, unlike CPAP machines, is an autonomous device that is local to the nose and which provides a required amount of air flow at a required pressure to treat various breathing disorders such as obstructive sleep apnea ("OSA"). Further details on use with a CPAP device are set out in the above mentioned incorporated by reference published application. In the published application either a nose ring version or the alternative configuration having a body that houses the micro pump, an exhalation valve, etc. can be used.

Referring now to FIG. 3, a schematic view of the configurations of a CPAP device 300 is shown to include, an exhalation valve 302 coupled to the micro pump 200 within the CPAP device 300. The exhalation valve 302 is coupled between the micro pumps 200 (or 100 as well) and inlets 304a, 304b and outlets 308a, 308b of the device 300, as shown. The exhalation valve 302 is of a butterfly configuration and uses air flow from the micro pumps to close the valves 302 at the end of an exhalation/beginning of pause in breathing and at the beginning of exhalation, the exhalation valve 302 opens even as the micro pumps blows air on the exhalation valves 302. Details are discussed in the above published application.

Referring now to FIGS. 4A-4D, an alternative implementation of a sliding valve disclosed in the above published application is shown.

Referring first to FIG. 4A, details are shown for an exemplary sliding valve 1010 (a "T" or "Tau" valve) used on outlet ports. This is similar to or the same as the "T" or "Tau" valve disclosed in the above published application. The "T" or "Tau" valve has a moveable member in the shape of the letter "T" (also similar in shape to the Greek letter "Tau"). The "T valve" 1010 includes a flat member 1012 that provides a valve to close off the outlet port and with the flat member 1012 connected to a stem member 1014 that resides in a compartment 1017 formed from regions 1018. Outlets from the chamber are provided by regions 1016. The valve 1010 is disposed in regions 216 of the module layers 201 (FIGS. 2A-2D).

Also shown in FIG. 4A at the inlet port 150, is a novel "curved T" (also can be referred to as "curved Tau") sliding valve 1040 that can be used in replace of the "Omega valve" disclosed in the above published application for inlet ports to the chambers, e.g., in regions 214 of the module layers 201 (FIGS. 2A-2D). In some respects, the curved T (or curved Tau but herein after referred to as the curved T) sliding valve 1040 also 'roughly' resembles an anvil shaped member. The focus below will be on the curved T (i.e., curved Tau) sliding valve 1040. The novel curved T sliding valve 1040 has an upper portion 1040a of the moveable member in the shape of a "T" (or the Greek letter "Tau") also a lower portion 1040b.

Referring now to FIG. 4B, the novel curved T sliding valve 1040 at the inlet port 150 is shown in detail. The upper portion 1040a has a top member 1042 with a flat surface 1042a on a top side of the top member 1042. The top member 1042 has a second flat surface 1042b on the bottom side of the top member 1042. The second flat surface 1042b extends from each edge of the top member 1042 for a portion of the length of the top surface 1042a towards a central portion of the top member 1042. The second flat surface 1042b is joined by a somewhat curved (or conical shaped) side surface 1042c that provides a first bulging element 1043. Side surface 1042c can be a smooth curve surface or a somewhat curved surface that is formed from a smooth curve and a planar surface. The somewhat curved side surface 1042c joins a first end of a stem portion 1044 and a second end of the stem portion 1044 is joined to a second bulging member 1046 that has a somewhat triangular shaped wall 1046a. The bulging member 1046 (i.e., bulge) is joined to a second flat member 1046b beneath the triangular shaped member 1046a.

The curved side surface 1042b of the valve 1040 fits into the upper portion of a confining region 1058 formed by a pair of spaced wall portions 1051a, 1051b (shown in FIG. 4B and FIG. 4B-1, with sectioning fill to have those features prominent illustrated) of the body. The second bulge member 1046 having the exterior surface 1046a and the lower flat surface 1046b is likewise fitted to the shape of the confining region 1058. Also shown in FIG. 4B, as a dash line, is a typical region where a cut would be made during a dicing operation to free the body of the module during assembly as will be discussed below. Suffice it to say that beneath the flat surface 1046b is a tether 1047 that secures the valve 1040 to the body during subsequent processing steps up to dicing.

The inlet port 150 has a pair of spaced inlet portions 1052a, 1052b and a central inlet portion 1052c. The spaced inlet portions 1052a, 1052b, allow fluid ingress from an external environment into the compartment, whereas the confining region 1058 provides a space that functions to allow the valve 1040 to freely move up and down. The flat surfaces 1042b and 1046b confine the valve 1040 to remain in the inlet port. The bulges 1043 and 1046 act as 'plugs' to plug the confining region 1058 (as illustrated in FIGS. 4D and 4E. Thus, the flat surfaces 1042b and 1046b cooperate to obstruct and thus confine the valve 1040 within the region of the inlet port 150, while the bulges 1043 and 1046 cooperate to plug the confining region 1058 during operation.

Recalling that the chamber 203 is produced from the pump body 204, end walls, and membranes 206 (FIG. 2B). In FIG. 4A, a portion of the material that is used to produce the pump body 204 provides the T valve 1010 at what would be an outlet port of a micro pump chamber and similarly, a portion of the material that is used to produce the pump body 204 provides the curved T sliding valve 1040 at what would be an inlet port 150 of a micro pump chamber.

While the curved T sliding valve 1040 is particular to the configuration of the chamber, e.g., 203 the body having the curved recessed region in the body, the distinctiveness over the omega valve in the published application is more than the shape of the valve member 1042.

The valve 1040 for controlling entry of fluid into a compartment has the inlet port 150 bifurcated by the pair of spaced wall portions 1051a, 1051b that form the confining region 1058 and the pair of spaced inlet portions 1052a, 1052b and 1052c into the chamber 203. Fluid egress also occurs through a passage between the pair of spaced wall portions 1051a, 1051b around the bulge 1046 when the valve is open. The valve member 1040 has the upper portion 1040a position-able within the chamber 203 and the lower portion 1040b that is coupled to the upper portion 1040a via the stem 1044, position-able within and confined by the confining region 1058.

Referring also to FIG. 4B-1, the confining region 1058 formed by the pair of spaced wall portions 1051a, 1051b has a first portion with an opening "A" of a first size and a second portion with an opening "B" of a second size that is larger than the first size "A". The lower portion 1040b has the bulging region 1046 that has a size that fits through the confining region 1058, but the member 1046b has the flat surface that has a size that is larger than the opening in the confining region 1058 that prevents the bulging region 1046 from passing completely through the confining region 1058. The upper portion 1040a of the valve member has the bulge portion 1043 that has a size that fits through confining region, but the member 1042 has the flat surface 1042b that has a size that is larger than the top opening in the confining region 1058 that prevents the bulging region 1043 from passing completely through the confining region 1058 and also has the flat surface that has a size that is larger than the size "C" of opening into the chamber 203.

The bulge region 1046 in the lower portion 1040b prevents the lower portion of the valve member 1040 from leaving the confining region 1058, just as the bulge 1043 in the upper portion 1040a and the flat surface 1042a of the upper portion will prevent the upper portion of the valve 1040 from leaving the compartment C. The bulge regions 1043, 1046 in the upper and lower portions 1040a, 1040b can be configured to seat within portions of the confining region 1058 during operation of the valve 1040, as can the flat regions 1042a and 1046b that are urged against walls of the confining region 1058.

Figure 4C:
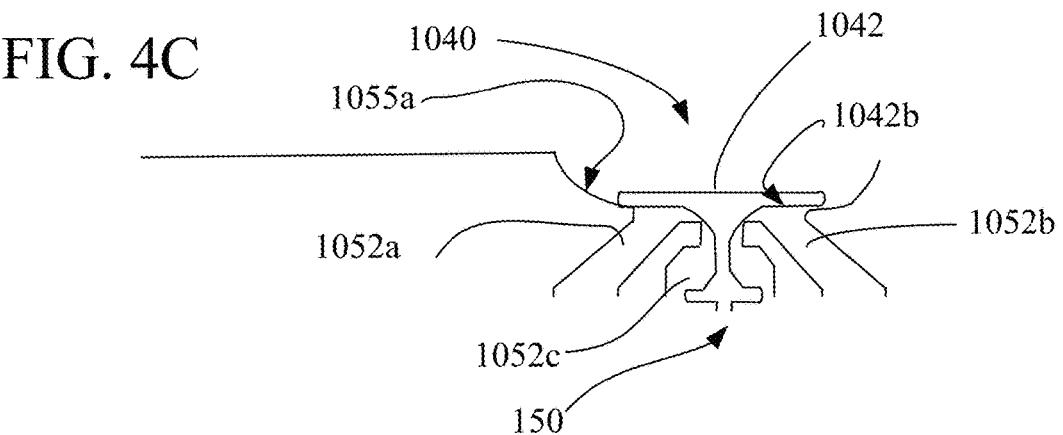
Figure 4D:
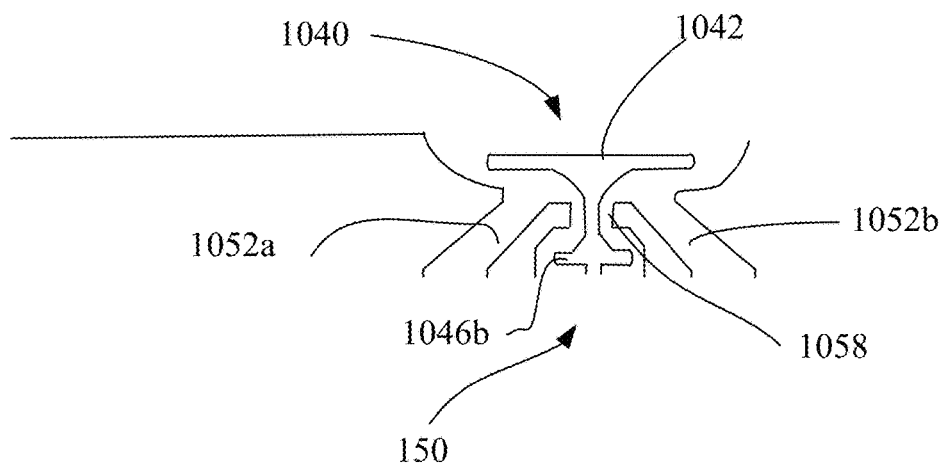
Figure 4E:
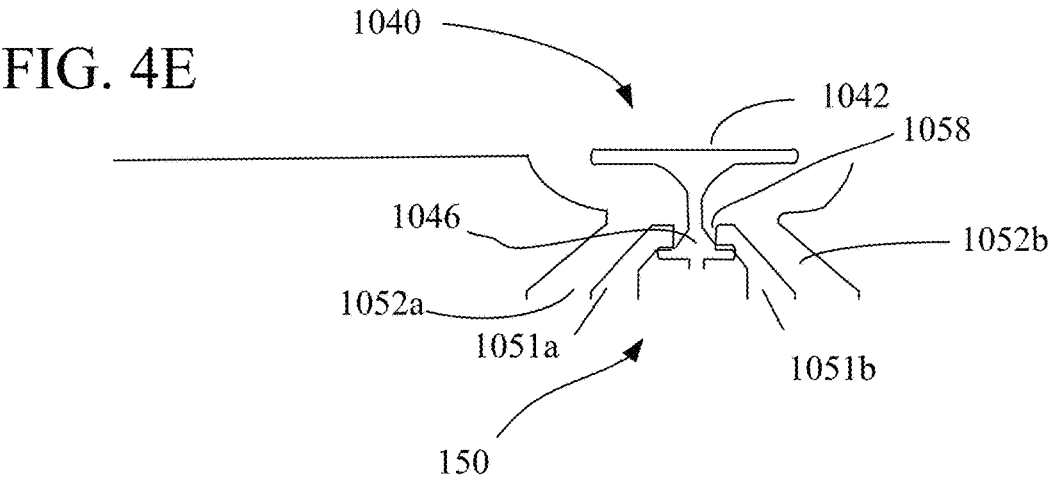

Referring now to FIGS. 4C-4E positions of the curved T sliding valve 1040 are shown.

Referring to FIG. 4C, the curved T sliding valve 1040 is shown at the inlet port 150 in a closed position. The curved T sliding valve 1040 closes off the inlets 1052a, 1052b, and 1052c by having the lower surface 1042 of the top member 1042 being urged against portions 1055a of interior walls of the compartment that partially define the spaced inlets 1052a, 1052b and 1052c.

Referring to FIG. 4D, the curved T sliding valve 1040 is shown at the inlet port 150 in a rest or quiescent position, in which the curved T sliding valve 1040 is allowed to freely move around being confined by the first and second flat members 1042 and 1046b and confining region 1058.

Referring to FIG. 4E, the curved T sliding valve 1040 is shown at the inlet port 150 in an open position. The curved T sliding valve 1040 is displaced from the inlets 1052a, 1052b by having the top member 1042 being displaced away from the pair of inlets 1052a, 1052b through a pressure of a fluid (not shown) entering the inlet port 150 and thus displacing the flat surface 1042b on the bottom side of the member 1042 from the pair of inlets 1052a, 1052b, and being moved away from portions 1055a of the interior walls of the compartment. The bulge member 1046 and the second flat member 1046b are urged into the confining region 1058 defined by the pair of spaced wall portions 1051a, 1051b of the body.

As shown in FIGS. 4C and 4E, the central portion 1052c of the inlet port 150 is likewise closed off with the curved T sliding valve 1040 in the closed position (by member 1042) and in the open position (by member 1046). However, a small amount of fluid pass through the central region 1052c during transitions between open and closed or closed and open positions of the valve 1040.

The etched body has the sliding valves 1010 and 1040 ("T valve" and curved T valve) on outlet and inlet ports 152, 150, respectively and which are formed by removing excess material from the material of the body guided by the etch lines 1002, as shown, leaving each of the sliding valves 1010 and 1040 to move freely within very confined regions, according to fluid pressures at inlets and outlets relative to pressure in the chamber but not being free to move outside of the confining regions.

Roll to Roll Processing for Producing Micro Pumps and Valves

Roll to roll processing line can comprises several stations, e.g., station 1 to station n (not shown) and which can be or include enclosed chambers) at which deposition, patterning, and other processing occurs. Processing viewed at a high level thus can be additive (adding material exactly where wanted) or subtractive (adding material and removing material in places where wanted). Deposition processing includes evaporation, sputtering, and/or chemical vapor deposition (CVD), as needed, as well as printing. The patterning processing can include depending on requirements techniques such as scanning laser and electron beam pattern generation, machining, optical lithography, gravure and flexographic (offset) printing depending on resolution of features being patterned. Ink jet printing and screen printing can be used to put down functional materials such as conductors. Other techniques such as imprinting and embossing can be used.

The original raw material roll is of a web of flexible material. In roll to roll processing the web of flexible material can be any such material and is typically glass or a plastic or a stainless steel. While any of these materials (or others) could be used, plastic has the advantage of lower cost considerations over glass and stainless steel and is a biocompatible material for production of the micro-pump when used in the CPAP type (continuous positive airway pressure) breathing device. In other applications of the micro-pump, e.g., as a cooling component for electronic components other materials such as stainless steel or other materials that can withstand encountered temperatures would be used, such as Teflon and other plastics that can withstand encountered temperatures.

In manufacturing the micro pump, the sacrificial filling material that can be employed is, e.g., polyvinyl alcohol (PVA). The sacrificial filling material can be used, if needed, to support the membrane over the pump body during processing. Solvents then would be used in the manufacturing process to subsequently remove this sacrificial filling material.

The roll having the micro-pump units (pump body and membrane with electrode and electrical connections) are diced and the micro-pump units are collected, assembled into stacks of micro-pump units, and packaged by including the end and top caps to provide micro-pumps (e.g., of FIG. 2A). Depending upon the layout of the pump units on the web it may be possible to fold the web of the pump units into a stack of pump units, with electrodes provided on the membrane layer.

The membrane material is required to bend or stretch back and forth over a desired distance and thus should have elastic characteristics. The membrane material is impermeable to fluids, including gas and liquids, is electrically non-conductive, and possesses a high breakdown voltage. Examples of suitable materials include silicon nitride and Teflon.

The material of the electrodes is electrically conductive. The electrodes do not conduct significant current. The material can have a high electrical resistance, although the high resistance feature is not necessarily desirable. The electrodes are subject to bending and stretching with the membranes, and therefore, it is desirable that the material is supple to handle the bending and stretching without fatigue and failure. In addition, the electrode material and the membrane material adhere well, e.g., do not delaminate from each other, under the conditions of operation. Examples of suitable materials include, e.g., gold, silver, and platinum layers (or conductive inks such as silver inks and the like). A release material can be used for allowing for valve movement. Suitable release materials include, e.g., the sacrificial filling material mentioned above.

Microelectromechanical systems such as micro pumps having the above described features are fabricated using roll to roll (R2R) processing. Roll-to-roll processing is becoming employed in manufacture of electronic devices using a roll of flexible plastic or metal foil as a base or substrate layer. Roll to roll processing has been used in other fields for applying coatings and printing on to a flexible material delivered from a roll and thereafter re-reeling the flexible material after processing onto an output roll. After the material has been taken up on the output roll or take-up roll the material with coating, laminates or print materials are diced or cut into finished sizes.

Referring to FIGS. 5A-5D, a roll to roll processing approach to provide the modularized micro pump 200 (FIG. 2A) is shown. The micro-pump 200 has features that are moveable in operation and may be release-able from carriers during manufacture. These features include the membrane (which flexes) and the sliding valves of (FIGS. 4A-4-E) that are tethered during fabrication and are released at a stage of fabrication. In this discussion, the focus will be on valves having features that slide and be released (the T valve at the output ports and curved T valve at the inlet ports).

The micro pump 260 is fabricated using roll to roll processing where a raw sheet (or multiple raw sheets) of material is passed through plural stations to have features applied to the sheet (or sheets) and the sheet (or sheets) are subsequently taken up to form parts of the repeatable composite layers (See FIGS. 2A-2D) to ultimately produce a composite sheet of fabricated micro-pumps (or other structures having moveable and/or release-able features).

In the implementation of micro pump of FIGS. 2A-2D, the roll to roll processing provides features that are freely moveable (e.g., free to move) within the constructed microelectromechanical systems.

Referring to FIG. 5A, a sheet 304 of a flexible material such as a glass or a plastic or a stainless steel is used as a web. For the particular implementation of the micro-pump 200 (FIGS. 2A-2D) with sliding valves, the material is a plastic sheet, e.g., Polyethylene terephthalate (PET), which is provided with a layer 304a of metal e.g., aluminum (Al) over a major surface of the sheet 304.

The sheet 304 is a 50 micron thick sheet of PET (Teflon) that coated with a thin metal layer 304a of aluminum having a 100A° (Angstroms) thickness. Other thicknesses could be used (e.g., the sheet 304 could have a thickness between, e.g., 25 microns and 250 microns (or greater) and the thickness of the layer 304a can be 50 A° to 500 A° (or greater). The thicknesses are predicted on desired properties of the microelectromechanical system to be constructed and the handling capabilities of roll to roll processing lines. These considerations will provide a practical limitation on the maximum thickness. Similarly, the minimum thicknesses are predicted on the desired properties of the microelectromechanical system to be constructed and the ability to handle very thin sheets in roll to roll processing lines.

For the example, where the microelectromechanical system is the micro pump, the layers would have thicknesses as mentioned above approximately 50 microns for the pump body and 5 microns for the membrane elements of the micro pump 200. However, other thicknesses are possible. The metal layer 304a is provided by various approaches, such as evaporation or other techniques. Such metalized films are also commercially available.

The sheet 304 from a roll (not shown) with the layer 304a of metal is patterned at an ablation station, e.g., a laser ablation station 1. A mask (not shown) is used to configure the laser ablation station to remove the metal layer 304a from those portions of the sheet 304 that will be used to form the micro pump units, i.e., the body, the regions 1018, the regions 1022 and 1024b, while leaving metal 304' only on portions of the sheet that will ultimately become moveable parts, which in the case of the micro pump with sliding valves (as shown in FIGS. 4A-4E), shown in detail in FIG. 5A-1. Optionally, the metal 304' can also be left on those extraneous portions of the sheet where the various structures are not fabricated, in order to same time/expense in unnecessary ablation.

The metal left on the sheet portions that will become Tau portion of the Tau valve and the curved T portion of the curved T valve permit those features to move within the respective valves. This technique relies on the recognition that during lamination of plastic layers as discussed below, the plastic will not laminate to the metal based on conditions that will be employed by subsequent lamination techniques. However, under these conditions the plastic will stick to underlying plastic. The defined conditions include heat, pressure and time that during lamination are sufficient to cause the plastic to stick to the underlying plastic by an electrostatic mechanism without melting the PET.

Figure 5B:
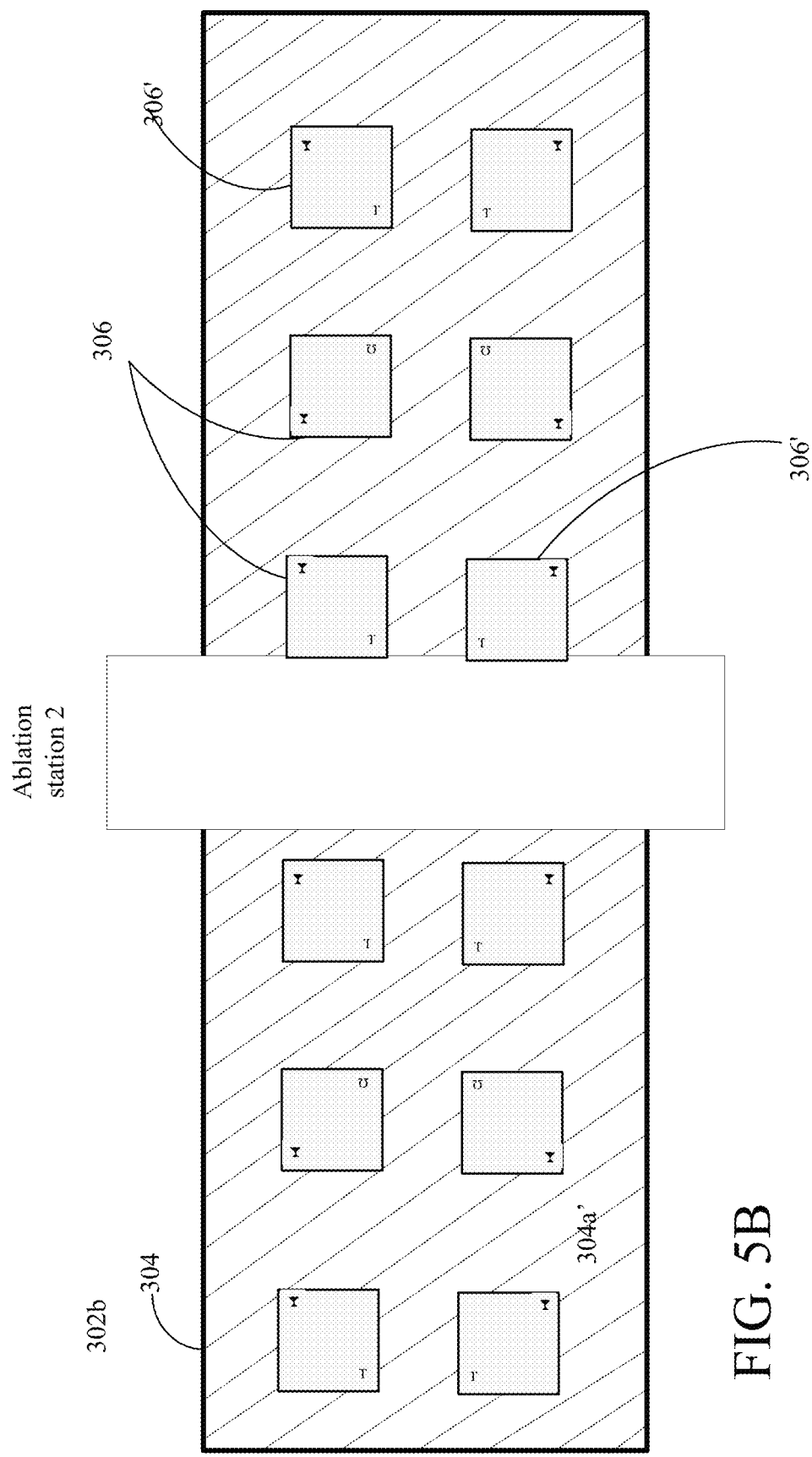

Referring now to FIG. 5B, the sheet 304 with the metal left 304a' on sheet portions that will align to the T portion of the T valve and the curved T portion of the curved T valve (i.e., curved Tau valve), and optionally on the extraneous portions, is micro-machined. A second mask (not shown) is used to configure a second laser ablation station to define or form the compartment and valve members (denoted as regions 306 in FIG. 5B) of the micro pump, as well as alignment holes (not shown but discussed in the published application). Vias are also provided for electrical connections, as shown and discussed in the published application. The micro-machining ablates away the plastic to form the compartment of the micro pump while leaving the frame portion of the pump body and also forms the containment structures for the valves as generally shown for item 306'.

Figure 5C:
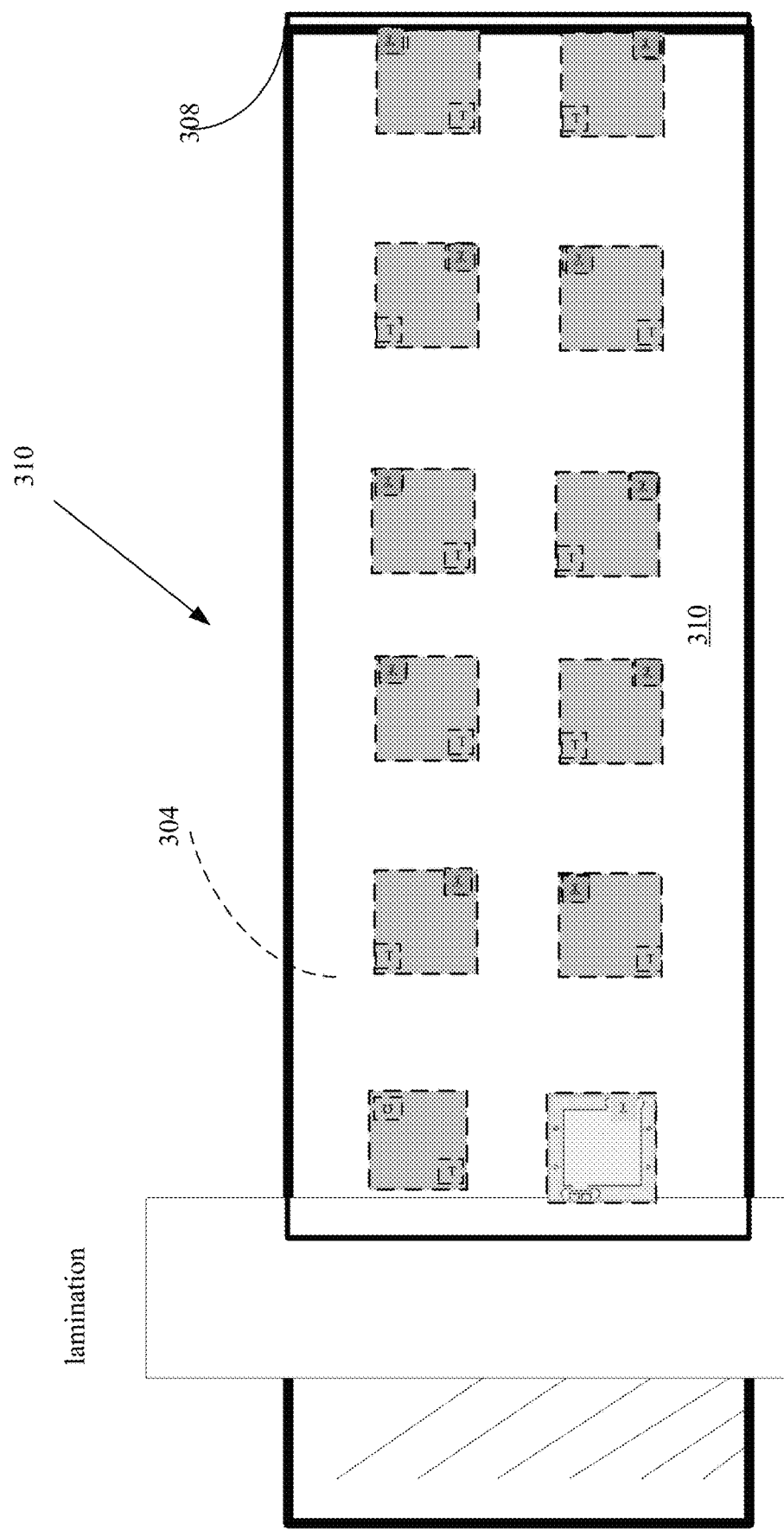

Referring now to FIG. 5C, the sheet 304 with the defined features of the T portion of the T valve and the curved T portion of the curved T valve, and the compartment is laminated at a lamination station to a second sheet 308, e.g., 5 micron thick sheet of PET, with a second metallic layer 310 of Al of 100 A on a top surface of the sheet. This second sheet 308 forms the membranes over the pump bodies provided by the defined features of the compartment and valve regions. The second sheet is also machined to provide the alignment holes (not shown) prior to or subsequent to coating of the metallic layer.

Prior to lamination of the second sheet 308 to the first sheet 304, the second sheet 308 is also provided with several randomly dispersed holes (not shown) over some areas that will be in alignment with the pump bodies structures. These randomly dispersed holes are used by a machine vision system to reveal and recognize underlying features of the pump body units on the first sheet 304. Data is generated by noting the recognized features in the first sheet through the random holes. These data will be used to align a third ablation station when forming electrodes from the layer over the pump bodies (discussed below) and metallic pads in regions over the Tau and Curved T features.

The second sheet 308 is laminated to and thus sticks (or adheres) to the first sheet 304 in areas where there is plastic on the first sheet 304 and plastic on the second sheet 308, but does not adhere or stick to the first sheet 304 where there is metal on the first sheet 304 and plastic on the second sheet 308. This selective sticking results because the lamination conditions discussed above. This permits the moveable members in the micro pump to freely move, e.g., the Tau and curved T structures.

At this point, a composite sheet 310 of repeatable units of the micro pump, e.g., pump body and movable and releasable features, with membranes are formed, but without electrodes formed from the layer on the membrane. This selective sticking provided by the use of metal on features that would come in contact with the sheet can be used to provide other moveable features such as flaps on flap valves, beams, cantilevered structures, gears, etc., in other micro-electromechanical systems that include such moveable features.

The machine vision system produces a data file that is used by the laser ablation system in aligning a third laser ablation station with a fourth mask such that a laser beam from the laser ablation system provides the electrodes 210 (FIG. 2B) according to the fourth mask, with the electrodes in registration with the corresponding portions of the pump bodies. The electrodes are formed by ablating away the metal in regions that are not part of the electrodes and conductors, leaving isolated electrodes and conductors on the sheet. The registration of the patterned electrodes to the pump body is thus provided by using the machine vision system to observe features on the front side of the laminated structure providing positioning data that the laser ablation system uses to align a laser beam with the fourth mask, using techniques commonly found in the industry.

Figure 5D:
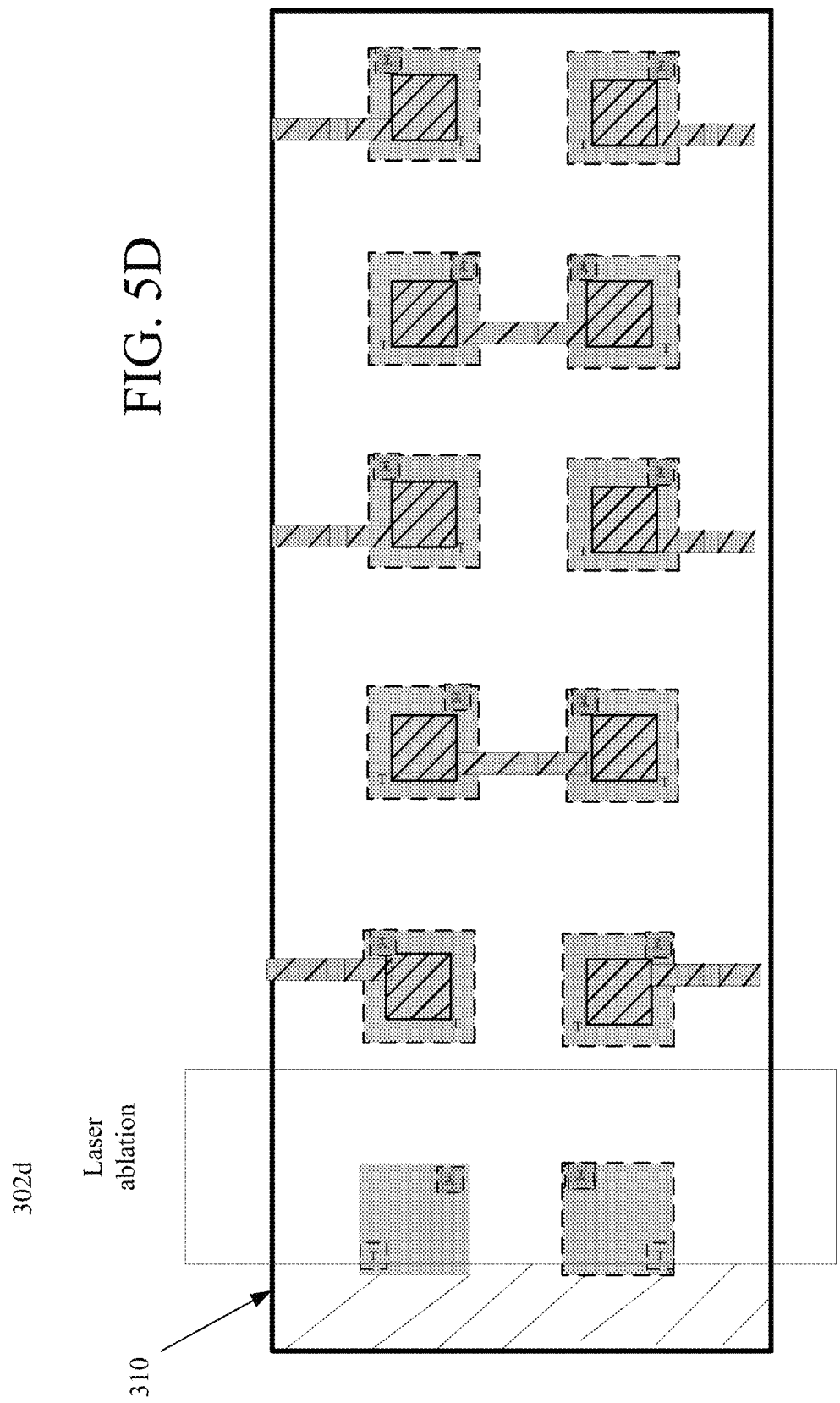

Referring now to FIG. 5D, the composite sheet 310 is fed to a third laser ablation station, to form the electrodes by ablating the 100 A° Al layer deposited on the second sheet that formed the membrane. The composite sheet 310 is patterned according to a fourth mask (not shown but in the published app.) to define the electrodes over corresponding regions of the pump body. The third ablation station ablates away metal from the second layer leaving isolated electrodes on the sheet.

A jig (not shown) that can comprises vertical four posts mounted to a horizontal base is used to stack individual ones of the cut dies. On the jig an end cap (e.g., a 50 micron PET sheet with a metal layer) is provided and over the end cap a first repeatable unit is provided. The repeatable unit is spot welded (applying a localized heating source) to hold the unit in place on the jig. As each repeatable unit is stacked over a previous repeatable unit that unit is spot welded. The stack is provided by having the T values on one side of the stack and the Curved T valves on the other of the stack, and staggered resulting from arrangement of the valves so as to have a solid surface separating each of the values in the stack (See FIG. 2D). Once a stack is completed, a top cap (not shown) can be provided. The stack unit is sent to a lamination station not shown, where the stack is laminated, laminating all of the repeatable units and caps together. The end cap and top cap can be part of the packaging as well. Otherwise sets of repeatable units can be laminated in pairs. Other stacking techniques for assembly are possible with or without the alignment holes 334.

Modifications can be applied to the roll to roll processing. For example, the 50 micron thick sheet of the flexible material (not shown) with the metal region, can be provided with a double sided adhesive over the major surface and which will be used as the body layer 14 (FIG. 1). The adhesive is a type 1801. For the particular implementation the material is polyethylene terephthalate (PET). Other materials could be used.

The sheet with the adhesive is patterned 64 to clear the adhesive from all regions that will correspond to moving parts. Thus, for example portions of the sheet correspond to the valves are cleared of adhesive, e.g., by using a mask (not shown) to configure a laser ablation station to remove the adhesive from areas of the sheet within which the those features will be formed.

The sheet is micro-machined 66 using another mask (not shown) or direct write to configure a laser ablation station to define or form the compartment and the valve elements (see FIG. 4A). Vias are also provided for electrical connections, as needed. The micro-machining ablates away the plastic to form the compartment and valve members, as described above.

The sheet is adhered to a membrane sheet, e.g., 5 micron thick sheet of PET with a metallic layer of Al of 100 A thickness. This provides a module layer. Other processing can be as stated above.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein. Other embodiments are within the scope of the following claims. For example, the top surface of the "curved T" valve need not be flat, it could have various other shapes. The "curved T" valve could have other shapes. Also while the body is described as having two passages through walls of the body to define the inlet into the compartment, one passage can be used to define in the inlet by one or two wall portions of the body that form the confining region. However with only one passage, the valve will likely slide with a tilting is a substantially asymmetric matter, tilting to the side of the body that does not have a passage.

What is claimed is:

1. A valve for controlling entry of fluid into a compartment of a micro-mechanical device, the valve comprising:
    a body defining the compartment, with the body having a pair of passages that provide an inlet into the compartment, with the pair of passages being bifurcated by a pair of spaced portions of the body that form a confining region having an opening between the pair of spaced portions of the body and which pair of spaced portions are further spaced from adjacent portions of the body to provide the pair of passages into the compartment; and
    a valve member having a first portion that has a first obstruction, an intermediate portion, and a second portion having a second obstruction, with the first portion position-able within a portion of the compartment, the intermediate portion connecting the second portion to the first portion, and with the first and second obstructions confining the valve member to slide through but not leave the confining region, and with the confining region providing a space to allow the valve member to freely move within the confining region while at a rest or quiescent position.

2. The valve of claim 1 wherein the confining region provided by the pair of spaced portions of the body have a size that allows the intermediate portion to freely slide through the confining region, according to fluid pressures applied to the valve, and which size is smaller than a size of the first or the second obstructions.

3. The valve of claim 2 wherein the first and second obstructions have first and second flat surfaces respectively of the first and second obstructions.

4. The valve of claim 3 wherein the first and second obstructions further have first and second bulge regions adjacent the respective first and second flat surfaces, with the first and second bulge regions configured to plug the opening in the confining region during periods of operation of the valve.

5. The valve of claim 4 wherein the bulge regions have a size that allows each respective bulge region to sit within the opening in the confining region.

6. The valve of claim 3 wherein the first portion of the valve member has the first flat surface that has a size that is larger than the opening defined by the pair of passages that provide the inlet into the compartment.

7. The valve of claim 6 wherein the size of the first flat surface being larger than the opening into the compartment seals the inlet when the valve is in a closed position.

8. The valve of claim 6 wherein the size of the first flat surface being larger than the opening into the compartment prevents the valve from falling from the inlet and seals the inlet when the valve is in a closed position.

9. The valve of claim 3 wherein the second portion of the valve member has the second flat surface that has a size that is larger than the opening in the confining area.

10. The valve of claim 9 wherein the size of the second flat surface being larger than the opening in the confining region seals the opening in the confining region, while displacing the first flat surface from the pair of passages when the valve is in an open position.

11. The valve of claim 6 wherein the size of the second flat surface being larger than a second opening in the confining region prevents the valve from falling from the compartment, displacing the first flat surface when the valve is in an open position.

12. The valve of claim 1 wherein the intermediate portion is a stem shaped portion that connects the first and second portions.

13. The valve of claim 1 wherein the first portion, the second portion and the intermediate portion of the valve member are an integrally formed member.

14. The valve of claim 1 wherein the body is a flexible plastic material and the valve further comprises:
    a sheet of a flexible plastic material that is laminated to the body to provide a composite laminated structure.

15. The valve of claim 14 wherein the sheet of the flexible plastic material has a metallic region that is aligned with the valve member provided in the sheet.

16. A micro-pump comprising:
    a pump body having walls defining a pump chamber that is compartmentalized into plural compartments, with the pump chamber having a plurality of inlet ports providing fluid ingress into the pump chamber, with the plurality of inlet ports in the pump body each having a pair of passages that are bifurcated by a pair of spaced portions of the pump body that form a confining region having an opening between the pair of spaced portions of the pump body, and which pair of spaced portions of the pump body are further spaced from adjacent portions of the pump body to provide the pair of passages into respective compartments, and the pump chamber further having a plurality of outlet ports providing fluid egress from the respective compartments;
    a plurality of membranes disposed in the pump chamber, with the plurality of membranes affixed between opposing walls of the pump body, and which membranes compartmentalize the pump chamber into providing the plural compartments within the pump chamber;
    a plurality of electrodes, with a first pair of the plurality of electrodes disposed on a pair of opposing walls of the pump body, and remaining ones of the plurality of electrodes disposed on major surfaces of the membranes; and
    a plurality of valves disposed in the plurality of inlet ports for controlling entry of fluid into respective compartments of the micro pump, with each of the plurality of valves in the inlet ports comprising:
    a valve member having a first portion that has a first obstruction, an intermediate portion, and a second portion having a second obstruction, with the first portion position-able within a portion of the compartment, the intermediate portion connecting the second portion to the first portion, and with the first and second obstructions confining the valve member to slide through but not leave the confining region, and with the confining region providing a space to allow the valve member to freely move within the confining region while at a rest or quiescent position.

17. The micro-pump of claim 16 wherein the confining region provided by the pair of spaced portions has a size that allows the intermediate portion to freely slide through the confining region, according to fluid pressures applied to the valve member, and which size is smaller than a size of the first or the second obstructions.

18. The micro-pump of claim 16 wherein the first portion, the second portion and the intermediate portion of the valve member are an integrally formed member.

19. The micro-pump of claim 16 wherein the first and second obstructions have first and second flat surfaces respectively of the first and second obstructions.

20. The micro-pump of claim 19 wherein the first and second obstructions further have first and second bulge regions adjacent the respective first and second flat surfaces with the first and second bulge regions configured to plug the opening in the confining region during periods of operation of the valve member.

21. The micro-pump of claim 20 wherein the bulge regions each have a size that allows each respective bulge region to sit within the opening in the confining region during periods of operation of the valve member.

22. The micro-pump of claim 19 wherein the first portion of the valve member has the first flat surface that has a size that is larger than the opening between the pair of passages that define the inlet port into the compartment, with the size of the first flat surface being larger than the opening into the compartment to seal the inlet port when the valve member is in a closed position, and the size of the first flat surface being larger than the opening into the compartment to prevent the valve member from falling from the inlet port.

23. The micro-pump of claim 19 wherein the second portion of the valve member has the second flat surface that has a size that is larger than the opening in the confining region, with the size of the second flat surface being larger than the opening into the confining region to seal the opening in the confining region and displaces the first flat surface when the valve member is in an open position, and prevents the valve member from falling into the compartment.

* * * * *